Aug. 7, 1951  H. E. BALLARD  2,563,636
HYDRAULIC GREASE GUN
Filed March 28, 1949
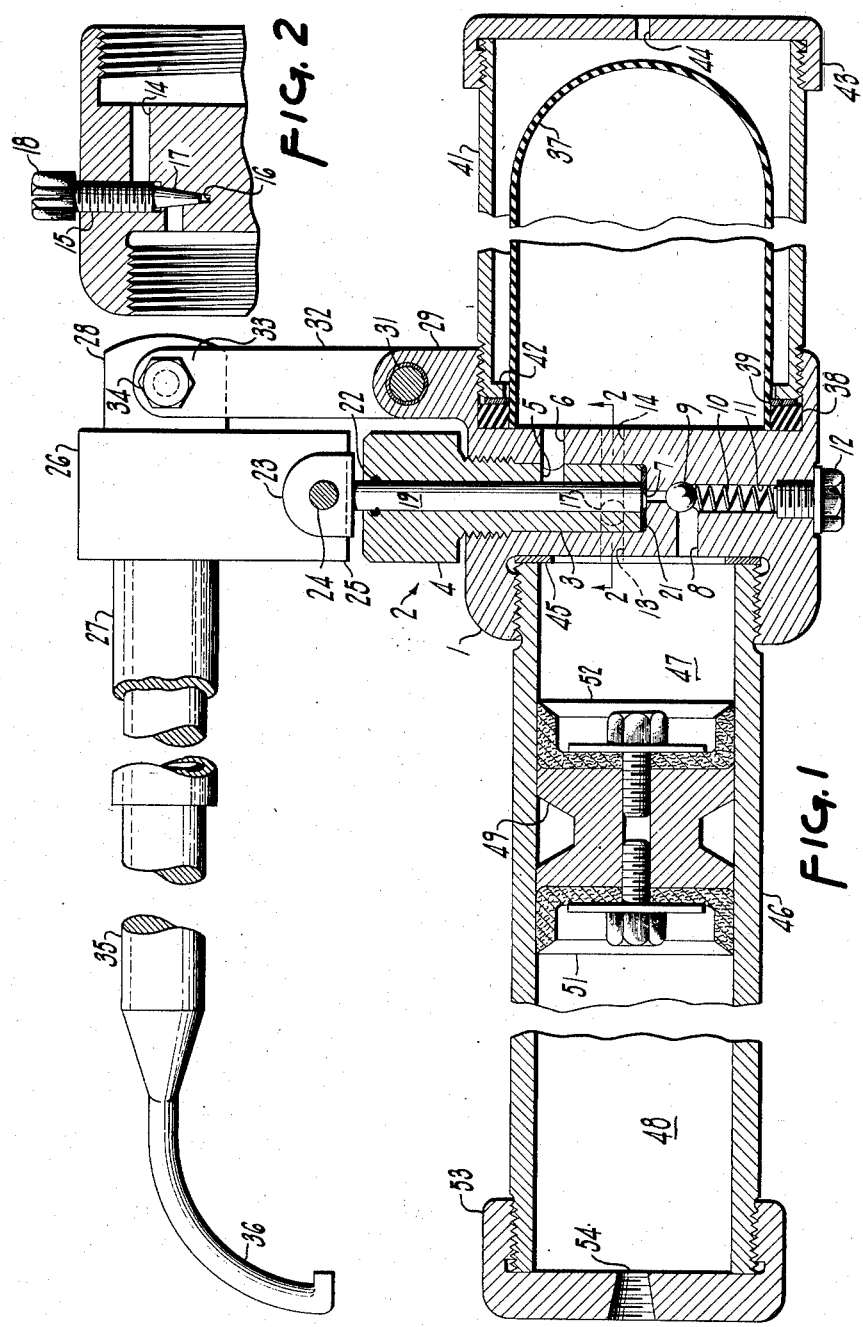
INVENTOR.
HERMAN E. BALLARD
BY
ATTORNEYS Patented Aug. 7, 1951

2,563,636

UNITED STATES PATENT OFFICE 2,563,636

HYDRAULIC GREASE GUN

Herman E. Ballard, Berkeley, Calif.

Application March 28, 1949, Serial No. 83,805

1 Claim. (Cl. 222—389)

1

This invention relates to and in general has as its object the provision of an hydraulically operated lubricating gun particularly suitable for dispensing semi-solid greases.

More specifically, the object of my invention is the provision of a grease gun including a base member in which is incorporated a manually operable piston pump having an intake communicating with a liquid working medium containing expansible elastomer bag and with an outlet communicating with a lubricant cylinder fastened to the base and in which is disposed a floating piston serving to divide the cylinder into an outer lubricant containing chamber and into an inner working medium containing chamber.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claim may be embodied in a plurality of forms.

Referring to the drawings:

Fig. 1 is a longitudinal mid-section taken through a grease gun embodying the objects of my invention;

Fig. 2 is a partial section taken on the section line 2—2 of Fig. 1.

As shown in these figures, the objects of my invention have been embodied in a grease gun including a cylindrical base 1 within which is incorporated a piston pump generally designated by the reference numeral 2. Threaded into a bore 3 formed in the base member 1 is a cylinder 4 provided with an inner inlet opening 5 communicating with a passageway 6 formed in the base 1 and with an outer outlet 7 communicating with a passageway 8 formed in the base 1. Disposed intermediate the ends of the passageway 8 is a ball check 9 backed by a light spring 10 receivable in a bore 11 formed in the base 1 coaxially with its bore 3. Threaded in the outer end of the bore 11 in contact with the outer end of the spring 10 is a plug 12. Also formed in the base 1 are a pair of parallel laterally offset passageways 13 and 14 intersected by a threaded transverse passageway 15, terminating at its inner end in a conical seat 16. Receivable in the seat 16 is the tapered end 17 of a screw 18, the screw 18 being threaded into the passageway 15 and serving as a means for establishing communication between the offset passageways 13 and 14.

Operatively disposed within the cylinder 4 is a piston 19. The lower end of the cylinder 4 is sealed to the base member 1 by a copper gasket 21 and the piston 19 is sealed to the upper end of the cylinder 4 by a rubber O-ring 22. Provided on the upper outer end of the piston 19 are a pair of transversely spaced upwardly extending ears 23 and receivable between and pivoted to these ears by a pin 24, is a lug 25 depending from and formed integral with a clamp 26. Welded to and within the clamp 26 is a sleeve 27 terminating at its right hand end in a flat 28. Formed integral with and extending upwardly from the base member 1 are a pair of parallel, transversely spaced lugs 29 and pivoted to these lugs by a pin 31 is a link 32 having a bifurcated upper end 33 pivoted to the flat 28 by a pin or bolt 34. Telescopically receivable in the sleeve 27 is a handle 35 terminating in a wrench 36.

Disposed over the right-hand face of the base member 1 is a collapsible elastomer bag 37 formed with an outwardly extending flange 38. Surrounding the bag 36 immediately to the rear of its flange 38 is a washer 39 and circumscribing the bag 37 is a cylindrical shield 41 threaded to the base member 1 and provided with an inwardly extending flange 42 arranged to seat against the outer face of the washer 39 and to seal the bag flange 38 against the right-hand face of the base member 1. Threaded over the outer end of the shield 41 is a cap 43 provided with a central opening 44 for the ingress of air.

Threaded to the left-hand face of the base member 1 in sealing engagement with a leather washer 45 is a lubricant cylinder 46. Operatively disposed within the cylinder 46 and dividing it into an expansible working medium containing chamber 47 and an expansible grease containing chamber 48 is a floating piston 49 provided at either end with leather cup seals 51 and 52. Threaded to the outer end of the cylinder 46 is a cap 53 formed with a tapered threaded outlet 54 by which the chamber 48 can be placed in communication with any piece of mechanism such as a valve which is to be lubricated.

To place a grease gun of the character above described in operation, the collapsible bag 37 is filled with any desired liquid working medium such as a light oil, this preferably being done with the bag under the influence of a partial vacuum. This having been done and with the piston 19 in its lowermost position as shown in Fig. 1, so that it serves to close the intake 6, a stick of semi-solid grease is introduced into the chamber 48 by removing the cap 53. The cap 53 is then replaced and the outlet 54 connected with the valve to be lubricated. A rotation of the outer end of the handle 35 in a clockwise direction about the pin 34 serves to elevate the piston 19 and in so doing creates a partial vacuum within the lower end of the cylinder 4, the check valve 9 being closed during the upward stroke of the piston. When the lower end of the piston 19 has moved to a point above the intake 5, working medium contained within the resilient elastomer bag 37 will pass through the passageway 6 and through the intake 5, into the lower end of the cylinder 4. This result is brought about due to the fact that the exterior of the bag 37 is always subjected to atmospheric pressure, whereas the working medium within the bag is under the partial vacuum created within the lower end of the cylinder 4 by the upward travel of the piston 19. Upon the downward stroke of the piston 19 brought about by rotating the handle 35 in a counter-clockwise direction, the piston 19 will close the intake 5 and consequently the working medium trapped beneath the piston 19 within the lower end of the cylinder will be forced downwardly through the outlet 7, depressing the ball check 9 and passing through the outlet or passageway 8 into the working medium chamber 47 of the cylinder 46. A repetition of the cycle of operation will of course result in the filling of the working medium chamber 47 with the working medium and in thereafter forcing the floating piston 49 to the left as viewed in Fig. 1 in predetermined increments depending upon the effective volume of the cylinder 4.

When the piston 49 has reached the end of its operative stroke and it is desired to recondition the gun for further use, the screw 18 is unscrewed to an extent sufficient to establish communication between the passageways 13 and 14, the cap 53 of the lubricant cylinder 46 is removed (conveniently by the aid of the wrench 36), a new stick of grease is inserted in the lubricant chamber 48 and forced inwardly so that the movement of the plunger 49 to the right as viewed in Fig. 1 will result in forcing the working medium contained in the chamber 47 through the intercommunicating passageways 13 and 14 back into the bag 37. The cap 53 is then replaced, whereupon the gun is ready for further use.

In recapitulation, it will be seen that I have provided a positively acting grease gun of simple construction wherein grease is dispensed under the action of a floating piston, wherein the floating piston is hydraulically operated by a manually operated piston pump, and wherein working medium is delivered to the manually operated pump under a differential pressure brought about by the external pressure to which the bag 37 is subjected and the partial vacuum to which the working medium is subjected upon the upward or outward stroke of the piston 19.

I claim:

An hydraulic grease gun comprising: a base member; a lubricant cylinder fixed directly to one side of said base member; an elastomer bag sealed to the opposite side of said base member; an open ended working medium pump cylinder provided in said base member with its axis transverse to the axis of said lubricant cylinder, said pump cylinder and base member being provided with a passageway for establishing communication between said elastomer bag and the interior of said pump cylinder at a point intermediate its ends and said base member being provided with a passageway for establishing communication between the inner ends of said pump and lubricant cylinders; a spring biased check valve mounted in said latter passageway for permitting working medium from said pump cylinder to enter said lubricant cylinder; a working medium piston mounted in said pump cylinder and arranged to open and close the said passageway communicating with said elastomer bag; a floating piston mounted in said lubricant cylinder; and a lever mounted on said base member and linked to said working medium piston.

HERMAN E. BALLARD.

REFERENCES CITED

The following references are of record in the file of this patent:

UNITED STATES PATENTS

| Number | Name | Date |
|---|---|---|
| 1,106,144 | Harrison | Aug. 4, 1914 |
| 1,725,720 | Pederson | Aug. 20, 1929 |
| 1,780,888 | Webelhoer | Nov. 4, 1930 |
| 1,867,515 | Lassiter | July 12, 1932 |
| 1,868,060 | Grebenstein | July 19, 1932 |
| 2,097,612 | Arnold | Nov. 2, 1937 |
| 2,352,390 | Kirkland | June 27, 1944 |